United States Patent [19]

Krull et al.

[11] Patent Number: 5,718,821

[45] Date of Patent: Feb. 17, 1998

[54] COPOLYMERS OF ETHYLENICALLY UNSATURATED CARBOXYLIC ACID ESTERS WITH POLYOXYALKYLENE ETHERS OF LOWER, UNSATURATED ALCOHOLS AS FLOW-IMPROVING AGENTS FOR PARAFFIN CONTAINING OILS

[75] Inventors: Matthias Krull, Bad Soden am Taunus; Sigmar-Peter von Halasz, Liederbach; Werner Reimann, Duisburg; Juliane Balzer, Frankfurt am Main; Horst Geiss, Hattersheim am Main, all of Germany

[73] Assignee: Hoechst Aktiengesellschaft, Frankfurt, Germany

[21] Appl. No.: 821,284

[22] Filed: Mar. 20, 1997

Related U.S. Application Data

[62] Division of Ser. No. 914,773, Jul. 15, 1992, abandoned.

[30] Foreign Application Priority Data

Jul. 18, 1991 [DE] Germany .......................... 41 23 795.1

[51] Int. Cl.$^6$ ........................................................ C10G 73/00
[52] U.S. Cl. ........................................... 208/24; 208/27
[58] Field of Search ....................................... 208/24, 27

[56] References Cited

U.S. PATENT DOCUMENTS

| | | |
|---|---|---|
| 2,892,783 | 6/1959 | Stuart et al. . |
| 3,073,807 | 1/1963 | Stuart et al. . |
| 3,189,586 | 6/1965 | Stuart et al. . |
| 3,192,165 | 6/1965 | Fields et al. ............................ 252/56 |
| 3,337,516 | 8/1967 | Stuart et al. . |
| 3,428,615 | 2/1969 | Stuart et al. . |
| 3,904,385 | 9/1975 | Sweeney . |
| 3,951,929 | 4/1976 | Sweeney . |
| 4,891,145 | 1/1990 | Brod et al. . |
| 4,920,180 | 4/1990 | Toyoshima et al. ............... 526/329.6 |
| 4,972,025 | 11/1990 | Tsubakimoto et al. ............ 525/329.6 |
| 5,039,432 | 8/1991 | Ritter et al. . |

FOREIGN PATENT DOCUMENTS

| | | | |
|---|---|---|---|
| 481657 | 3/1952 | Canada ............................. | 526/329.6 |
| 0183447 | 3/1990 | European Pat. Off. . | |
| 1 225 980 | 7/1960 | France . | |
| 57-202311 | 12/1982 | Japan ............................... | 526/329.6 |
| 664324 | 1/1952 | United Kingdom ............ | 526/329.6 |
| 917 923 | 2/1963 | United Kingdom . | |
| 1368729 | 10/1974 | United Kingdom . | |
| 2 174 096 | 10/1986 | United Kingdom . | |
| 2174096 | 10/1986 | United Kingdom ............ | 526/329.6 |

Primary Examiner—Joseph L. Schofer
Assistant Examiner—N. Sarofim
Attorney, Agent, or Firm—Connolly and Hutz

[57] ABSTRACT

The invention relates to novel copolymers of ethylenically unsaturated carboxylic acid esters with polyoxyalkylene ethers of lower, unsaturated alcohols, their preparation, their use as flow-improving agents for paraffin-containing oils, and oils which contain such copolymers.

The invention also relates to the use of known copolymers of ethylenically unsaturated carboxylic acid esters with polyoxyalkylene ethers of allyl and/or methallyl alcohol as flow-improving agents for paraffin-containing oils.

6 Claims, No Drawings

COPOLYMERS OF ETHYLENICALLY UNSATURATED CARBOXYLIC ACID ESTERS WITH POLYOXYALKYLENE ETHERS OF LOWER, UNSATURATED ALCOHOLS AS FLOW-IMPROVING AGENTS FOR PARAFFIN CONTAINING OILS

This application is a divisional application of Ser. No. 07/914,773, filed Jul. 15, 1992, which is now abandoned.

The invention relates to the use of copolymers of ethylenically unsaturated carboxylic acid esters with polyoxyalkylene ethers of allyl and/or methallyl alcohol as flow-improving agents for paraffin-containing oils. The invention also relates to novel copolymers of ethylenically unsaturated carboxylic acid esters with polyoxyalkylene ethers of lower, unsaturated alcohols, their preparation, their use as flow-improving agents for paraffin-containing oils, and oils which comprise such copolymers.

Crude oils, residue oils, oil distillates, such as, for example, diesel fuel, mineral oils, lubricating oils, hydraulic oils and the like contain, depending on their origin or the nature of their processing, larger or smaller amounts of n-paraffins and asphaltenes, which present particular problems, because they crystallize out or agglomerate when the temperature is lowered, and in this way can cause deterioration in the flow properties of these oils. This deterioration in the flow properties of the oils is called "setting" of the oil. The pour point is the standardized term for that temperature at which an oil, for example mineral oil, diesel fuel or hydraulic fluid, only just stops flowing. However, the pour point is not identical to the so-called flow point. The flow point is a non-specific term, which is not covered by standards, for that temperature at which a solid starts to flow under given measurement conditions. As a result of deterioration in the flow properties, tanks, pipelines, valves or pumps can become blocked, for example during transportation, storage and/or processing of these oils, especially in the case of paraffin-containing oils, which are difficult to inhibit. Particular difficulties arise in practice if the intrinsic pour point of these oils is above the ambient temperature, and in particular is 20° C. or more. In view of the decreasing world reserves of petroleum and the increasing opening up of deposits which produce crude oils having high intrinsic pour points, the extraction and transportation of such problem oils is acquiring an ever greater importance.

To reestablish or maintain the flow properties, there are a number of measures of a thermal or mechanical nature, for example scraping paraffin off the inner wall of pipes, heating entire pipelines or rinsing processes using solvents. It is certainly more elegant to combat the cause of the phenomenon by addition of flow-improving agents, which are also called pour point depressants or paraffin inhibitors. A reduction in the pour point to values of about 10° C. and below is in general advantageous here.

The mode of action of these flow-improving agents is in general explained by the fact that they inhibit the crystallization of paraffins and asphaltenes. The consequence is a reduction in the pour point and the maintaining of the flow properties of the oil at a low temperature. The effectiveness of the flow-improving agents here depends both on their structure and on their concentration.

Flow-improving agents are in general homo- or copolymers based on olefins, (meth)acrylic acid esters, maleic acid derivatives and certain vinyl monomers. Homopolymers of acrylic acid esters having $C_{18}$- to $C_{24}$-alkyl chains in the alcohol radical are thus known from GB-1 368 729 for use as pour point depressants in crude oils and residue oils. Copolymers of free (meth)acrylic acid and long-chain (meth)acrylic acid esters are known from U.S. Pat. No. 5,039,432 as flow-improving agents for crude oils and residue oils.

Esters of polyoxyalkylene ethers are described in various forms as flow-improving agents.

Copolymers of esters of fumaric acid with polyoxyalkylene glycols are known from GB-84/28880. Copolymers of 1-alkenes and the (meth)acrylic acid ester of a $C_{10}$- to $C_{24}$-alkylpolyoxyalkylene ether (EP-B-0 220 611), copolymers of (meth)acrylic acid esters with cyclic hydrocarbons which are alkoxylated via a hetero atom (DE-A-3 711 344) and mixtures of fatty acid esters of polyoxyalkylene ethers and $C_{10}$- to $C_{30}$-fumaric acid esters of polyoxyalkylene ethers (U.S. Pat. No. 4,891,145) are known as flow-improving agents for crude oils and paraffin-rich petroleum fractions. Copolymers of alkyl (meth)acrylates and esters of alkyl polyoxyalkylene ethers with (meth)acrylic acid are known from EP-A-0 418 610 as oil additives in diesel and spark ignition engines. Copolymers of polyoxyalkylene ethers of (meth)allyl alcohol and $C_1$- to $C_{20}$-alkyl (meth)acrylates are described in GB-2 174 096. However, these copolymers are used as demulsifiers for crude oil emulsions.

Disadvantages of the known flow-improving agents for crude oils and residue oils are the not yet adequate effectiveness and the resulting high use concentrations. Other disadvantages are the high intrinsic pour points of the flow-improving agents, which require warming and/or very high dilution for metering.

Copolymers which have improved properties as pour point depressants, i.e. are still adequately effective even at a low dosage, have a lower intrinsic pour point in comparison with pour point depressants of the prior art at the same concentration level and are effective on a large number of oils, in particular on paraffin-containing oils, are therefore sought.

The invention relates to the use of copolymers of ethylenically unsaturated carboxylic acid esters with polyoxyalkylene ethers of allyl and/or methallyl alcohol as flow-improving agents for paraffin-containing oils.

The use of copolymers of polyoxyalkylene ethers of (meth)allyl alcohol and $C_1$- to $C_{20}$-alkyl (meth)acrylates as demulsifiers for crude oil which contains water is known from GB-2 174 096.

Surprisingly, it has been found that the copolymers known from GB-2 174 096 improve the flow properties of paraffin-containing oils particularly effectively by significantly reducing the pour point, and that solutions of these copolymers in aromatic solvents at the same time have a very low intrinsic pour point. It has moreover been found that these copolymers are particularly effective when mixed with known homopolymers of acrylic acid esters or methacrylic acid esters of long-chain $C_{18}$ to $C_{24}$-fatty alcohols, such as are known, for example, from GB-1 368 729.

The present invention also relates to novel copolymers of ethylenically unsaturated carboxylic acid esters with polyoxyalkylene ethers of lower, unsaturated alcohols, their preparation, their use as flow-improving agents for paraffin-containing oils, and oils which comprise such copolymers.

The present invention thus relates to novel copolymers comprising 50 to 99.9% by weight, preferably 70 to 99.9% by weight, of at least one recurring structural element of the formula I

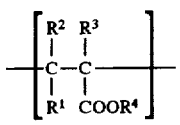

in which
R$^1$ and R$^2$ independently of one another are hydrogen, phenyl or a group of the formula COOR$^4$,
R$^3$ is hydrogen, methyl or a group of the formula CH$_2$COOR$^4$, or R$^2$ and R$^3$ together are C$_4$- to C$_7$-alkylene, and
R$^4$ is hydrogen, C$_8$- to C$_{40}$-alkyl or C$_8$–C$_{40}$-alkenyl,
with the proviso that recurring structural elements of the formula I contain at least one and not more than two carboxylic acid units of the formula COOR$^4$ or CH$_2$COOR$^4$ in one structural element,
and 0.1 to 50% by weight, preferably 0.1 to 30% by weight, of at least one recurring structural element of the formula II

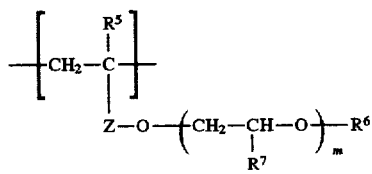

in which
R$^5$ is hydrogen or methyl,
Z is C$_1$ to C$_3$-alkylene,
R$^6$ is hydrogen, C$_1$- to C$_{30}$-alkyl, cycloalkyl, aryl or —C(O)—R$^8$,
R$^7$ is hydrogen or C$_1$- to C$_{20}$-alkyl,
R$^8$ is C$_1$- to C$_{30}$-alkyl, C$_3$- to C$_{30}$-alkenyl, cycloalkyl or aryl and
m is a number from 1 to 60, preferably between 1 and 30, with the proviso that if R$^6$ is hydrogen, R$^1$ and R$^2$ are not simultaneously hydrogen.

The copolymers according to the invention have structural elements of the formula I in which R$^4$ can be linear or branched alkyl chains having 8 to 40 carbon atoms, preferably 10 to 24 carbon atoms, or linear or branched alkenyl chains having 8 to 40 carbon atoms.

The copolymers according to the invention have structural elements of the formula II in which R$^6$ can be linear or branched alkyl chains having up to 30 carbon atoms, preferably having up to 24 carbon atoms, cycloalkyl radicals or aryl radicals. R$^7$ can be linear or branched alkyl chains having up to 20 carbon atoms, preferably methyl, and R$^8$ can be linear or branched alkyl chains having up to 30 carbon atoms, preferably up to 22 carbon atoms, linear or branched alkenyl chains having 2 to 30 carbon atoms, cycloalkyl radicals or aryl radicals, preferably phenyl.

The cycloalkyl radicals in general have a ring size of 5 to 7 carbon atoms, can be saturated or unsaturated, and/or contain one to several hetero atoms, such as S, O and N. Suitable cycloalkyl radicals are, for example, the cyclopentyl, cyclohexyl, cycloheptyl, cyclopentenyl, cyclohexenyl, cycloheptenyl, piperidyl or morpholinyl radical.

The aryl radicals are derived from mono- or polynuclear carbocyclic or heterocyclic aromatics and can carry, as substituents, alkyl radicals having 1 to 4 carbon atoms and/or halogen atoms, preferably fluorine or chlorine. Suitable aryl radicals are, for example, the phenyl, naphthyl, pyridyl or benzyl radical.

The copolymers according to the invention are prepared by copolymerization of 50 to 99.9% by weight, preferably 70 to 99.9% by weight, of the monomers of the formula (III) and 0.1 to 50% by weight, preferably 0.1 to 30% by weight, of the monomers of the formula IV by customary free radical polymerization processes.

$$R^1R^2C=CR^3COOR^4 \qquad (III)$$

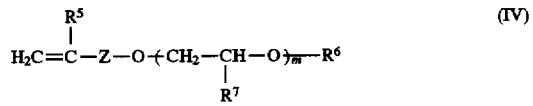

A suitable preparation process comprises dissolving the monomers of the formulae III and IV in an organic solvent and carrying out the polymerization in the presence of a free radical initiator at a temperature in the range from 30° to 150° C. Suitable solvents are aromatic hydrocarbons, such as, for example, toluene, xylene, trimethylbenzene, dimethylnaphthalene or mixtures of these aromatic hydrocarbons. Commercially available mixtures of aromatic hydrocarbons, such as, for example, Solvent Naphtha or Shellsol AB® (manufacturer: Shell) are also used. Aliphatic hydrocarbons are also suitable solvents. Alkoxylated aliphatic alcohols or esters thereof, such as, for example, butylglycol, are also used as solvents, but preferably as a mixture with aromatic hydrocarbons.

The free radical initiators used are usually customary initiators, such as azo-bis-isobutyronitrile, esters of peroxycarboxylic acids, such as, for example, t-butyl perpivalate and t-butyl per-2-ethylhexanoate, or dibenzoyl peroxide.

The monomers of the formula III are ethylenically unsaturated carboxylic acid esters which contain at least one and not more than two carboxylic acid units of the formulae COOR$^4$ and CH$_2$COOR$^4$.

The monomers of the formula III can be esters of monocarboxylic acids, such as acrylic acid, methacrylic acid or cinnamic acid, with C$_8$- to C$_{40}$-alcohols, preferably of acrylic acid with C$_{12}$–C$_{24}$-alcohols, particularly preferably of acrylic acid with C$_{18}$-, C$_{20}$- and/or C$_{22}$-alcohols. Suitable alcohols for preparation of the esters are, for example, coconut fat alcohol, tallow fat alcohol, lauryl alcohol, myristyl alcohol, cetyl alcohol and stearyl alcohol. The monomers of the formula III can also be esters of dicarboxylic acids. The half-esters of the dicarboxylic acids, such as, for example, the half-esters of maleic acid, fumaric acid or itaconic acid with C$_8$–C$_{40}$-alcohols, are preferably employed.

The monomers of the formula IV can be etherification products or esterification products of polyoxyalkylene ethers where R$^6$=H.

These polyoxyalkylene ethers where R$^6$=H can be prepared by known processes by addition of α-olefin oxides, such as ethylene oxide, propylene oxide and/or butylene oxide, onto polymerizable lower, unsaturated alcohols of the formula V

Such polymerizable lower, unsaturated alcohols are, for example, allyl alcohol, methallyl alcohol and butenols, such as 3-buten-1-ol, 1-buten-3-ol or methylbutenols, such as 2-methyl-3-buten-1-ol, 2-methyl-3-buten-2-ol or 3-methyl-3-buten-1-ol. Addition products of ethylene oxide and/or propylene oxide with allyl alcohol are preferred.

Subsequent etherification of these polyoxyalkylene ethers where R$^6$=H to give compounds of the formula IV where R$^6$=C$_1$- to C$_{30}$-alkyl, cycloalkyl or aryl is carried out by processes which are known per se. Suitable processes are known, for example, from J. March, Advanced Organic Chemistry, 2nd edition, page 357 et seq. (1977).

The etherification products of the polyoxyalkylene ethers, where $R^6$=H, of the formula IV can also be prepared by adding α-olefin oxides, preferably ethylene oxide, propylene oxide and/or butylene oxide, onto alcohols of the formula VI

$$R^6\text{—OH} \quad \text{(VI)}$$

in which $R^6$ is $C_1$- to $C_{30}$-alkyl, cycloalkyl or aryl, by known processes and reacting the product with polymerizable lower unsaturated halides of the formula VII

$$\underset{H_2C=C-Z-X}{\overset{R^5}{|}} \quad \text{(VII)}$$

in which X is a halogen atom and $R^5$ and Z have the above-mentioned meaning. The chlorides and bromides are preferably employed as the halides. Suitable preparation processes are mentioned, for example, in J. March, Advanced Organic Chemistry, 2nd edition, page 357 et seq. (1977).

The polyoxyalkylene ethers where $R^6$=H are esterified by reaction with customary esterifying agents, such as carboxylic acid halides, carboxylic acid anhydrides or carboxylic acid esters with $C_1$- to $C_4$-alcohols. The acid halides and anhydrides containing $C_1$- to $C_{30}$-alkyl, cycloalkyl or aryl are preferably used. The esterification is in general carried out at temperatures from 0° to 200° C., preferably 10° to 100° C. The carboxylic acid derivative is in general employed in a stoichiometric amount, based on the alcohol group of the polyoxyalkylene ether. However, it is possible to add the acid component in excess, for example in an excess of 20 to 100%, as well as in less than the stoichiometric amount. The esterification is advantageously carried out in a solvent. Suitable solvents are, for example, aromatic hydrocarbons, for example alkylaromatics, such as toluene, xylene, trimethylbenzenes, tetramethylbenzenes, dimethylethylbenzenes and dimethylnaphthalene, and mixtures of aromatics.

In the case of the acylated polyoxyalkylene ethers described above where $R^6$=C(O)—$R^8$, the copolymers according to the invention can be prepared by two routes. On the one hand, the polyoxyalkylene ethers where $R^6$=H can be copolymerized directly with the ethylenically unsaturated carboxylic acid esters of the formula III and the products can then be esterified by addition of carboxylic acid derivatives to give the copolymers according to the invention, and on the other hand it is also possible first to esterify the polyoxyalkylene ethers where $R^6$=H by addition of carboxylic acid derivatives to give the monomers of the formula IV, and then to copolymerize these with the ethylenically unsaturated carboxylic acid esters of the formula III. Because of the different reactivities of the monomers employed for the polymerization, different molecular weight distributions result from the two preparation processes.

In the monomers of the formula IV, the index m indicates the degree of alkoxylation, i.e. the number of moles of α-olefin oxide which are added on per mole of alcohol of the formula V or VI.

The copolymers according to the invention are soluble in organic solvents, such as toluene and xylene, and also in crude oil, paraffin-containing crude oil and paraffin-containing crude oil products, residue oils, petroleum distillates, such as, for example, diesel, hydraulic oils and mixtures of aromatic and aliphatic hydrocarbons, such as are commercially available, for example, under the names Shellsol® AB, Shellsol® R or Shellsol® A (manufacturer: Shell) and Solvesso® 100, Solvesso® 200 or Actrel® (manufacturer: Esso Chemie).

The monomers III and IV can be present in the copolymers according to the invention in any desired distribution, the distribution preferably being random. The molecular weights or molar mass distributions of the copolymers according to the invention are characterized by a K value of 10 to 100, preferably 10 to 80 (measured by the Ubbelohde method). The molecular weights $\overline{M}_n$ can lie in a range from 1,000 to 300,000, preferably 5,000 to 200,000, and can be determined, for example, by the gel permeation chromatography method with polystyrene calibration.

The copolymers according to the invention and the known copolymers can be used quite generally as flow-improving agents in paraffin-containing oils of any origin. The paraffins can be, for example, straight-chain or branched alkanes having 8 to 100, preferably 10 to 70, carbon atoms. The copolymers according to the invention and the known copolymers have a broad effectiveness in the most diverse paraffin-containing oils. They are therefore generally usable, for example in crude oils, other paraffin-containing oils and paraffin-containing oil products of the most diverse origin. Paraffin-containing oils are to be understood here as meaning, for example, crude oils, other paraffin containing oils and paraffin-containing oil products, such as are obtained during processing of crude oils, for example as distillation products, such as diesel fuel or hydraulic oil. They are particularly suitable as flow-improving agents for crude and residue oils. Paraffin-containing oils for which the copolymers according to the invention are also suitable as crystallization inhibitors are described in Compositions and Properties of Petroleum, F. Enke Publishers, Stuttgart 1981, pages 1 to 37.

The copolymers according to the invention and the known copolymers can be separated off from the solvent and the copolymers which have been separated off can be added to the oil. If the copolymers are to be isolated from the reaction mixture, this is possible, for example, by distilling off the solvent or by precipitation, for example by addition of acetone. However, it may be advantageous not to isolate the flow-improving agents, but to add the solution obtained during the polymerization to the petroleum to improve the flow properties. In general, the copolymers according to the invention are added to the oil in amounts such that the content of the copolymers is in the range from 10 to 10,000 ppm by weight, preferably in the range from 50 to 5,000 ppm by weight. The optimum use concentration may be different for different oils. It can be determined easily, if appropriate, for example by determining the use concentration at which optimum improvement in the flow properties occurs by routine pour point determinations (for example in accordance with DIN ISO 3016 of October 1982 or ASTM standard No. 97B, section 6f) or by routine viscosity measurements. The copolymers according to the invention and the known copolymers can already be added in the well hole for the crude oil, but can also be added before or during its transportation, its storage and/or its further processing.

The copolymers according to the invention and the known copolymers improve the flow properties of paraffin-containing oils above all at low temperatures, which is indicated by relatively large reductions in the pour points in comparison with paraffin inhibitors of the prior art. If precipitates are formed due to crystallization of the paraffin, deposits which are not so compact and/or do not adhere so firmly are formed due to the presence of the copolymers according to the invention and the known copolymers. The ease of handling paraffin-containing oils, such as crude oils, residue oils, oil distillates, such as, for example, diesel fuels, mineral oils, lubricating oils, hydraulic oils and the like, is thus overall improved significantly at low temperatures by addition of the copolymers according to the invention and the known copolymers, and blockages do not occur so readily during transportation, storage and/or processing. This also applies to oils which are otherwise difficult to inhibit against crystallization of paraffins.

The intrinsic pour points of 50% strength by weight solutions of the copolymers according to the invention and the known copolymers in aromatic solvents and mixtures thereof, such as, for example, in toluene, xylene or Shellsol AB®, are below 20° C. and are therefore significantly below those of conventional flow-improving agents. The copolymers consequently can be added to the petroleum or to the petroleum fraction without prior warming and/or from concentrated solution.

The effectiveness of the co- and terpolymers prepared according to the invention and of the known copolymers is described by determination of the pour points in accordance with the method of DIN ISO 3016. In this method, crude oil samples containing no additives and those containing the polymers as additives are tested for their flow properties under defined conditions after prior warming and subsequent defined cooling. The pour point analyses with the polymers according to the invention and the known polymers were carried out using an Indian crude oil which has a pour point of 29° C. in the untreated state.

The results obtained are summarized in Table 1. The particular use concentrations (ppm) mentioned in each case relate to polymers containing 50% of active compound. Products having a higher active compound content are diluted to a 50% strength active compound content with solvents, and products having a lower active compound content are metered into the oil in a correspondingly higher amount.

Table 2 shows comparison experiments with known pour point depressants.

Table 3 shows the intrinsic pour points of the copolymers according to the invention.

The following examples are intended to illustrate the invention, without limiting it.

I. PREPARATION OF THE MONOMERS

The preparation of some monomers which are not customary commercial products will be described below. The designation EO stands for ethylene oxide units and the designation PO stands for propylene oxide units.

1. Preparation of Allyl Polyglycol Benzoyl Ester 28.2 g of benzoyl chloride and 73.2 g of allyl polyglycol (7 EO) are dissolved in 100 g of toluene in a 500 ml 4-necked flask with a stirrer, contact thermometer, reflux condenser and gas inlet tube. The mixture is stirred at 60° C. for 8 hours, nitrogen being blown through the solution to accelerate the discharge of HCl. When the reaction has ended, the solvent is removed in vacuo. 90 g (96% of theory) of a pale yellow oil are obtained.

IR (film): 1705 cm$^{-1}$ (—C(O)—O—).

$^1$H-NMR (CDCl$_3$/TMS internal standard): 7.45 ppm (m, 3H); 8.04 ppm (m,2H).

2. Preparation of Allyl Polyglycol Stearoyl Ester

Analogously to I.1.

IR (film): 1720 cm$^{-1}$ (—C(O)—O—)

$^1$H-NMR (CDCl$_3$/TMS internal standard): 0.8 ppm (t,3H); 1.3 ppm (s,30H); 1.6 ppm (m,2H); 2.3 ppm (t,2H).

3. Preparation of Allyl Polyglycol Acetate 30.6 g of acetic anhydride and 110 g of allyl polyglycol (7 EO) are stirred in 140 g of toluene at 75° C. for 5 hours. The toluene and acetic acid are then removed by distillation in vacuo. 121 g (quantitative yield) of a red-brown oil are obtained.

IR (film): 1725 cm$^{-1}$ (—C(O)—O—).

$^1$H-NMR (CDCl$_3$/TMS internel standard): 2.06 ppm (s,3H).

II. PREPARATION OF THE COPOLYMERS

The percentage data are to be understood as percentages by weight in all cases. The intrinsic viscosity values K are determined by the Ubbelohde method at 25° C. in toluene at a polymer concentration of 5% by weight. The polymerizations are carried out in a 1 l five-necked flask fitted with an anchor stirrer, reflux condenser, contact thermometer, gas inlet tube and dropping funnel. The solutions initially introduced for the polymerization are flushed with nitrogen.

1. Preparation of a Copolymer of Stearyl Acrylate and 10% by Weight of Allyl Polyglycol 90 g of stearyl acrylate and 10 g of allyl polyglycol (7 EO) in 74 g of toluene are heated to 50° C., while passing nitrogen through. A catalyst solution of 1.0 g of azo-bis-isobutyronitrile in 25 g of toluene is added at this temperature over a period of 30 minutes. The mixture is stirred for in each case one hour at 60°, 70°, 80° and 90° C. to give a pale yellow copolymer, which is adjusted to a solids content of 50% with toluene. This copolymer has a K value (5% strength) of 30. The intrinsic pour point of the polymer solution is 18° C.

2. Preparation of a Copolymer of Stearyl Acrylate and 10% by Weight of Allylmethyl Polyglycol 112.5 g of stearyl acrylate and 12.5 g of allylmethyl polyglycol (6 EO) were dissolved in 100 ml of toluene, while heating, and the polymerization was carried out with azo-bis-isobutyronitrile as described in Example II.1. A copolymer is obtained, and is brought to a solids content of 50% with toluene and has a K value (5% strength) of 25.

3. Copolymerization in Butyl Diglycol/Shellsol AB®

133 g of stearyl acrylate and 7 g of allyl polyglycol (7 EO) were dissolved in a mixture of 15 g of butyl diglycol and 15 g of Shellsol AB®, while heating to 50° C. and passing nitrogen through. A copolymer having a K value (5% strength) of 30 was obtained by addition of a solution of 0.7 g of azo-bis-isobutyronitrile in 15 g of butyl diglycol and 15 g of Shellsol AB® over a period of 30 minutes and by subsequent after-heating. The intrinsic pour point of the 40% strength by weight polymer solution, diluted with Shellsol AB®, is 18° C.

4. Preparation of a Copolymer of Allyl Polyglycol and Alkyl Acrylate Under Catalysis by Tert-butyl Peroxypivalate 95 g of alkyl acrylate (chain fraction of 42% C$_{18}$-, 11% C$_{20}$-, 45% C$_{22}$- and 2% C$_{24}$-alcohol) and 5 g of allyl polyglycol (7 EO) were dissolved in 80 g of toluene, and polymerization was carried out by addition of a solution of 0.75 g of tert-butyl peroxypivalate as described under Example II.1. The resulting polymer has a K value (5% strength) of 30. The intrinsic pour point of the resulting polymer solution is 22° C.

5. Copolymer of Stearyl Acrylate and Allyl Polyglycol Acetate 95 g of stearyl acrylate and 5 g of the allyl polyglycol acetate (7 EO) prepared according to Example I.1. were polymerized analogously to Example II.1. The resulting 50% strength polymer solution has a K value (5% strength) of 33.

6. Copolymer of Stearyl Acrylate and 5% of Allyl Polyglycol 95 g of stearyl acrylate and 5 g of allyl polyglycol (with 4 EO) were polymerized analogously to Example II.1. The polymer has a K value (5% strength) of 33.

7. Terpolymer of Maleic Acid Stearyl Ester, Stearyl Acrylate and 10% of Allyl Polyglycol 48 g of maleic acid octadecyl ester, 41 g of stearyl acrylate and 10 g of allyl polyglycol (7 EO) were polymerized in 100 g of toluene as described in Example II.1. The resulting polymer has a K value (5% strength) of 15.

8. Esterification of a Copolymer of Stearyl Acrylate and Allyl Polyglycol with Acetyl Chloride 3.0 g of acetyl chloride are added to 100 g of a 50% strength solution of a copolymer of 90 g of stearyl acrylate and 10 g of allyl polyglycol according to Example II.1, and the mixture is stirred at 75° C. for 8 hours. Nitrogen is blown through the solution to accelerate the discharge of HCl. The resulting polymer has a K value (5% strength) of 35.

$^1$H-NMR (CDCl$_3$/TMS internal standard)=2.05 ppm (s).

The following copolymers based on stearyl acrylate were prepared analogously to Example II.1.

| Example | Comonomer | K value |
|---|---|---|
| 9 | 10% of allyl alcohol (10 EO) | 45 |
| 10 | 2% of allyl alcohol (15 EO) | 40 |
| 11 | 5% of allyl alcohol (10 PO) | 36 |
| 12 | 5% of allyl alcohol (5 EO + 5 PO) | 42 |
| 13 | 5% of 2-methyl-3-buten-2-ol (9 EO) | 37 |

TABLE 1

| Product | Amount employed (ppm) | Pour point (°C.) |
|---|---|---|
| Copolymer according to Example II.1. | 300 | 15.7 |
| Copolymer according to Example II.1. | 500 | 8.2 |
| Mixture of 20% of copolymer according to Example II.1. and 80% of polyacrylic acid C$_{18}$–C$_{22}$-alkyl ester | 300 | 13.3 |
| Mixture of 20% of copolymer according to Example II.1. and 80% of polyacrylic acid C$_{18}$–C$_{22}$-alkyl ester | 500 | 6.9 |
| Copolymer according to Example II.2. | 300 | 12.3 |
| Copolymer according to Example II.2. | 500 | 9.6 |
| Mixture of 20% of copolymer according to Example II.1. and 80% of polyacrylic acid C$_{18}$–C$_{22}$-alkyl ester | 300 | 11.3 |

TABLE 1-continued

| Product | Amount employed (ppm) | Pour point (°C.) |
|---|---|---|
| Mixture of 20% of copolymer according to Example II.1. and 80% of polyacrylic acid C$_{18}$–C$_{22}$-alkyl ester | 500 | 8.7 |
| Copolymer according to Example II.3. | 300 | 17.1 |
| Copolymer according to Example II.3. | 500 | 13.8 |
| Copolymer according to Example II.4. | 300 | 15.1 |
| Copolymer according to Example II.4. | 500 | 11.7 |
| Copolymer according to Example II.5. | 300 | 16.9 |
| Copolymer according to Example II.5. | 500 | 9.7 |
| Copolymer according to Example II.6. | 300 | 15.5 |
| Copolymer according to Example II.6. | 500 | 9.2 |
| Terpolymer according to Example II.7. | 300 | 17.2 |
| Terpolymer according to Example II.7. | 500 | 12.4 |
| Copolymer according to Example II.8. | 300 | 15.2 |
| Copolymer according to Example II.8. | 500 | 10.2 |
| Copolymer according to Example II.9. | 300 | 18.4 |
| Copolymer according to Example II.9. | 500 | 12.8 |
| Copolymer according to Example II.10. | 300 | 16.1 |
| Copolymer according to Example II.10. | 500 | 9.4 |
| Copolymer according to Example II.11. | 300 | 18.6 |
| Copolymer according to Example II.11. | 500 | 12.8 |
| Copolymer according to Example II.12. | 300 | 18.5 |
| Copolymer according to Example II.12. | 500 | 13.3 |
| Copolymer according to Example II.13. | 300 | 16.4 |
| Copolymer according to Example II.13. | 500 | 11.9 |

TABLE 2

(Comparison Examples):

| Product | Amount employed (ppm) | Intrinsic pour point (°C.) |
|---|---|---|
| Paradyne 70 ® | 300 | 25.5 |
| Paradyne 70 ® | 500 | 23.0 |
| Paradyne 85 ® | 300 | 30.6 |
| Paradyne 85 ® | 500 | 30.5 |
| Shellswim 5 T ® | 300 | 21.3 |
| Shellswim 5 T ® | 500 | 14.0 |
| Shellswim 11 T ® | 300 | 20.5 |
| Shellswim 11 T ® | 500 | 14.0 |

The flow-improving agents mentioned in Table 2 are commercially available products from the companies Exxon (Paradyne 70® and Paradyne 80®) and Shell (Shellswim 5 T® and Shellswim 11 T®).

TABLE 3

| Product | Intrinsic pour point (°C.) |
|---|---|
| Copolymer according to Example II.1. (50% strength) | 18 |
| Copolymer according to Example II.3. (40% strength) | 18 |
| Copolymer according to Example II.4. (48% strength) | 22 |
| Copolymer according to Example II.9. (53% strength) | 19 |
| Copolymer according to Example II.10. (57% strength) | 21 |

We claim:

1. A method of improving the flow properties of paraffin-containing oils comprising the step of adding to said oil a copolymer comprising 50 to 99.9% by weight of at least one recurring structural element of the formula I

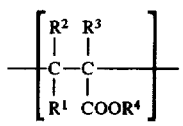

in which
- $R^1$ and $R^2$ independently of one another are hydrogen, phenyl or a group of the formula $COOR^4$,
- $R^3$ is hydrogen, methyl or a group of the formula $CH_2COOR^4$, or $R^2$ and $R^3$ together are $C_4$- to $C_7$-alkylene, and $R^4$ is hydrogen, $C_8$- to $C_{40}$-alkyl or $C_8$–$C_{40}$-alkenyl with the proviso that recurring structural elements of the formula I contain at least one and not more than two carboxylic acid units of the formula $COOR^4$ or $CH_2COOR^4$ in one recurring structural element, and 0.1 to 50% by weight, of at least one recurring structural element of the formula II

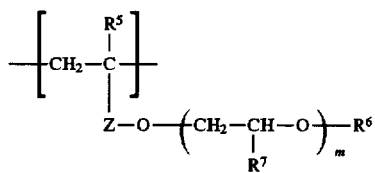

in which
- $R^5$ is hydrogen or methyl,
- Z is $C_1$- to $C_3$- alkyl,
- $R^6$ is hydrogen, $C_1$- to $C_{30}$-alkyl, cycloalkyl, aryl or —C(O)—$R^8$,
- $R^7$ is hydrogen or $C_1$- to $C_{30}$-alkyl, $C_3$- to $C_{30}$-alkenyl, cycloalkyl or aryl and m is a number from 1 to 60.

2. A method as claimed in claim 1, wherein in said copolymer, $R^1$ and $R^2$ independently of one another are hydrogen or $COOR^4$,
- $R^4$ is $C_{10}$- to $C_{24}$-alkyl,
- $R^6$ is hydrogen or methyl,
- $R^7$ is hydrogen or methyl and
- $R^8$ is $C_1$- to $C_{22}$-alkyl or phenyl.

3. A method as claimed in claim 1, wherein
- $R^1$ and $R^2$ are hydrogen,
- $R^3$ is hydrogen or methyl and
- $R^6$ is hydrogen.

4. A method of improving the flow properties of a paraffin-containing oil comprising the step of adding to said oil a composition comprising 10 to 90% by weight of a copolymer as claimed in claim 1 and 10 to 90% by weight of a polyacrylic acid $C_8$–$C_{24}$-alkyl ester.

5. A method of improving the flow properties of a paraffin-containing oil comprising the step of adding to said oil a composition comprising 10 to 90% by weight of a copolymer as claimed in claim 1 and 10 to 90% by weight of an aromatic solvent.

6. A method as claimed in claim 1, wherein said copolymer comprises 70 to 99.9% by weight of at least one said recurring structural element of the formula I and 0.1 to 30% by weight of at least one said recurring structural element of the formula II.

* * * * *